United States Patent [19]

Pensabene et al.

[11] Patent Number: 5,336,276
[45] Date of Patent: Aug. 9, 1994

[54] ELECTRODE HAVING A CONDUCTIVE CONTACT AREA AND METHOD OF MAKING THE SAME

[75] Inventors: Saverio F. Pensabene; Roy L. Royalty, both of Gainesville, Fla.

[73] Assignee: Eveready Battery Company, Inc., St. Louis, Mo.

[21] Appl. No.: 999,789

[22] Filed: Dec. 3, 1992

Related U.S. Application Data

[62] Division of Ser. No. 585,575, Sep. 20, 1990, Pat. No. 5,196,281.

[51] Int. Cl.$^5$ ............................................. H01M 10/44
[52] U.S. Cl. ...................................... 29/623.5; 205/57; 429/209; 429/223; 429/235; 428/613
[58] Field of Search .......................... 29/623.5; 205/57; 429/209, 223, 233, 235; 428/613

[56] References Cited

U.S. PATENT DOCUMENTS

| | | | |
|---|---|---|---|
| 1,940,385 | 12/1933 | Ackermann | 429/221 |
| 4,029,132 | 6/1977 | Jackovitz et al. | 429/223 |
| 4,060,676 | 11/1977 | Dey et al. | 429/223 |
| 4,224,392 | 9/1980 | Oswin | 429/223 |
| 4,330,603 | 5/1982 | Jackovitz et al. | 429/223 |
| 4,425,192 | 1/1984 | McKinley | 205/57 |
| 4,439,281 | 3/1984 | Schneider et al. | 205/57 |
| 4,443,526 | 4/1984 | Jackovitz | 429/223 |
| 4,973,534 | 11/1990 | Adendroff et al. | 29/623.1 |
| 4,975,035 | 12/1990 | Kuelinski et al. | 429/223 |
| 4,985,318 | 1/1991 | Oshitani et al. | 429/223 |

*Primary Examiner*—Mark L. Bell
*Assistant Examiner*—Willie J. Thompson
*Attorney, Agent, or Firm*—Robert W. Welsh

[57] ABSTRACT

An electrode for a rechargeable electrochemical cell including an electrically conductive substrate, a layer of an electrochemically active material attached to the substrate, the active material comprising a reducible species of a metal, at least one conductive contact area formed of a metallic form of said metal attached to said substrate, said metallic contact area comprising said reducible species in a converted form. A positive electrode is further provided wherein said active material is nickel hydroxide and said metallic form of said metal is nickel metal. The invention further comprises the method for manufacturing electrodes as described above, featuring use of reducing gas to effect conversion.

9 Claims, 2 Drawing Sheets

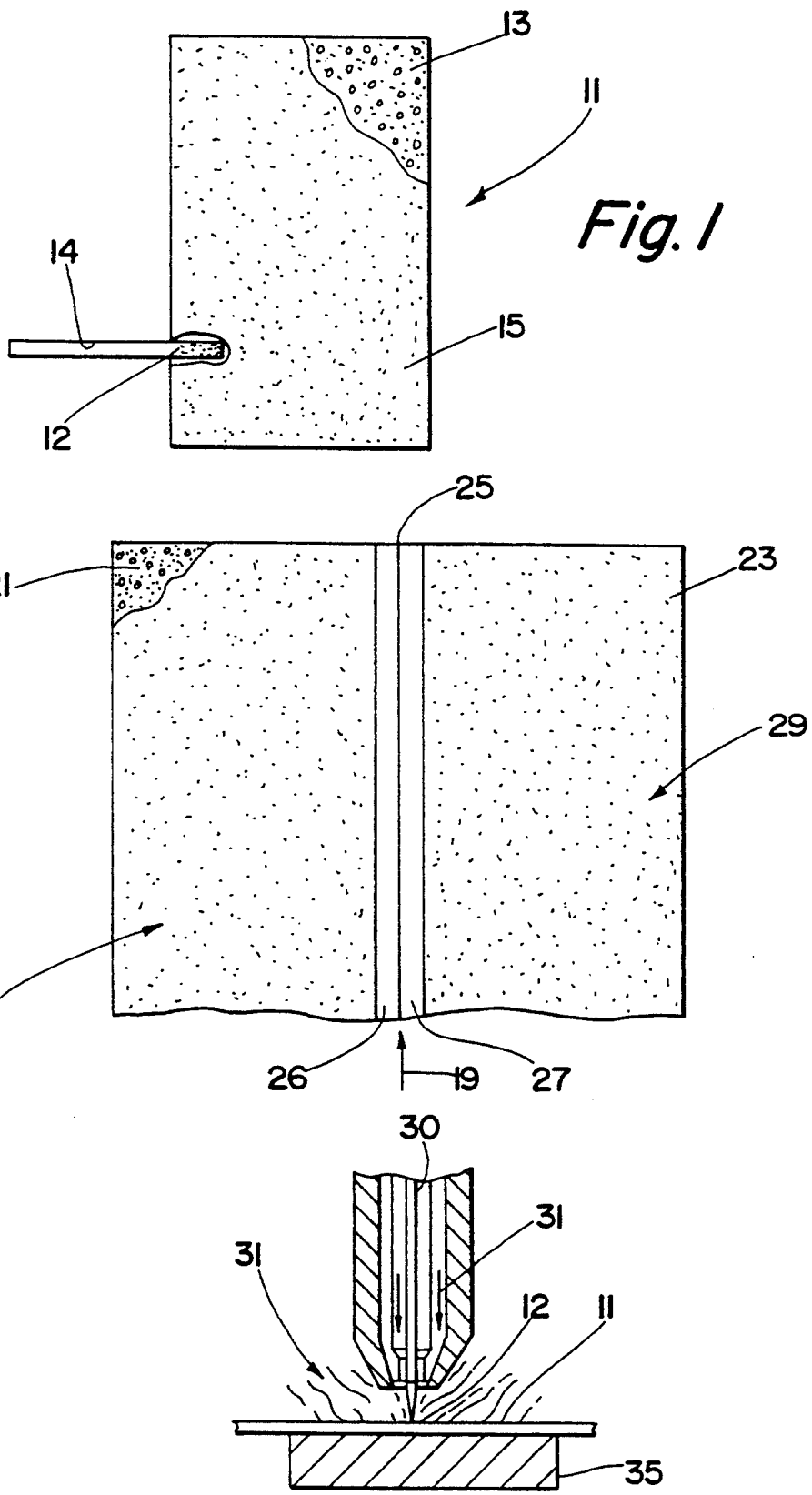

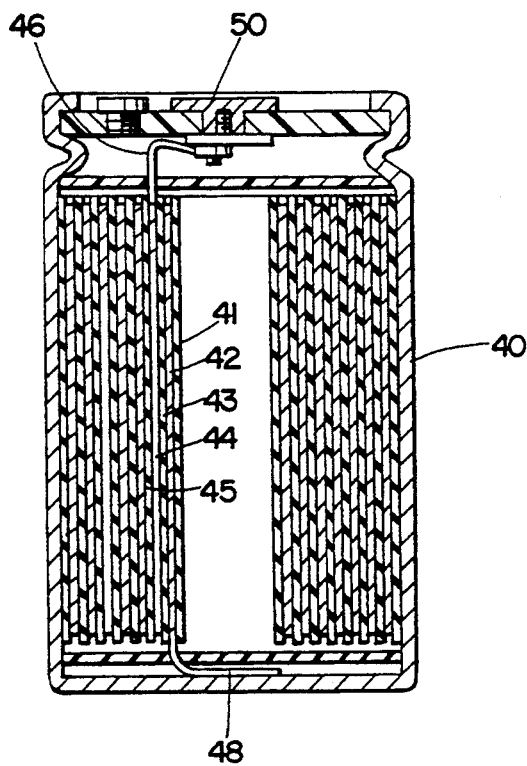
Fig. 4
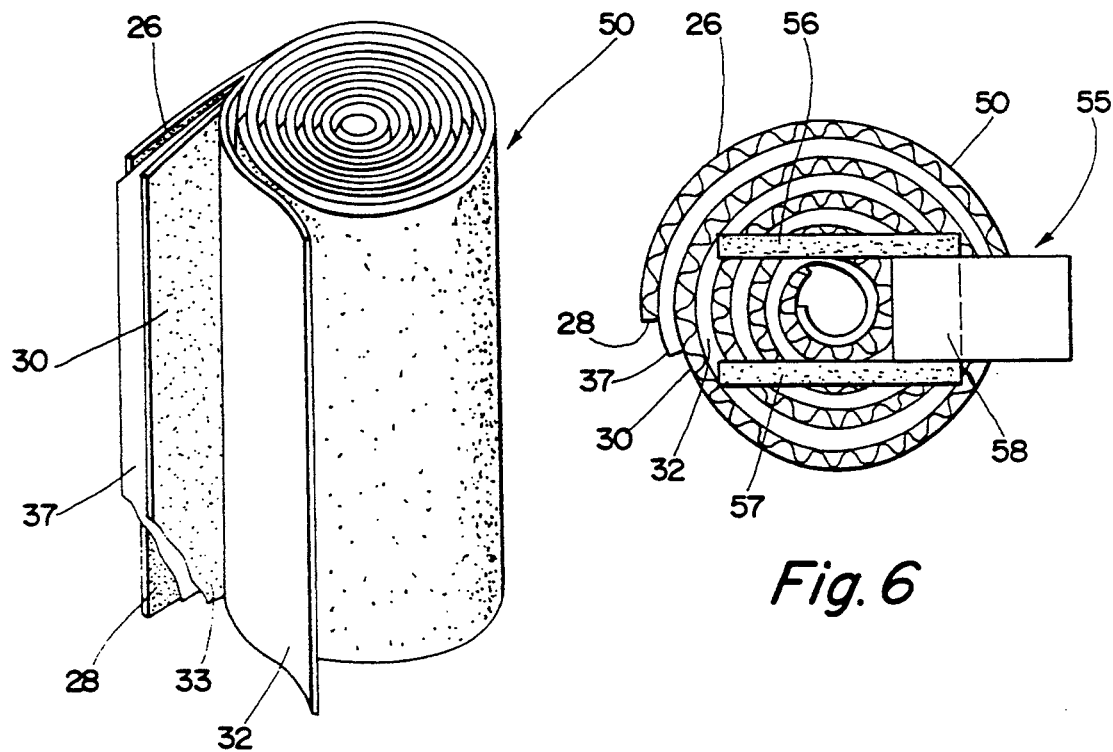
Fig. 5
Fig. 6

ELECTRODE HAVING A CONDUCTIVE CONTACT AREA AND METHOD OF MAKING THE SAME

This is a divisional of application Ser. No. 07/585,575, filed Sep. 20, 1990, now U.S. Pat. No. 5,196,281.

BACKGROUND OF THE INVENTION

This invention relates to electrodes for rechargeable electrochemical cells such as nickel cadmium cells. In such electrochemical cells a conductive contact area is provided to connect each electrode of the cell to a terminal of the battery in which the cells are placed. Frequently a contact tab is provided on the conductive area to provide a positive connection between the electrode and the corresponding battery terminal.

Electrodes have been made using a foam metal substrate impregnated with an electrochemically active material namely nickel hydroxide paste. On such an electrode it is very difficult to attach a current carrying contact tab. Welding is the preferred method of attachment, although welding such a contact to a foam metal substrate leads to mechanical weaknesses.

Alternatively, electrodes have been made using a perforated metal plate covered with a sintered porous nickel coating. Active material such as nickel hydroxide is then applied to the sintered plaque. Similarly, it is difficult to provide a contact area and to adhere a current conducting contact tab to the sintered plaque loaded with active material. In the past, the current conducting contact tab has been attached to an edge portion of the plate which projects from the portion covered with active material. This reduces the volumetric electrical capacity of the electrode as the electrochemically active ingredient cannot be located where the contact tab is required. Typically, a larger area was left unimpregnated than was required for contact adherence.

U.S. Pat. No. 4,439,281 shows another method of applying a contact tab to a highly porous structural body or substrate. In this patent a metal coating is applied or electrodeposited where a contact tab is desired. This method of electrodeposition of nickel on an edge for contact tab adherence is very time consuming, and the resulting nickel concentration although greater than that for a porous plate substrate, still presents welding problems.

Similarly, Japanese Patent Publication document 61-214363 shows an alternative method of attaching a conducting contact tab to an electrode of a battery. In this example, an energy source is used to fuse the edges of a metal felt. The thus densified metal provides a welding surface for the contact tab. The storage capacity of the cell, however, is diminished as the densified edges are not impregnated with nickel hydroxide for electrochemical activity.

The instant invention selectively converts an area of an electrode to conductive metal to provide a means for improved current collection.

It is well known to reduce nickel hydroxide by using a heated hydrogen source. In the area of electrochemical cells nickel hydroxide has been reduced to provide strengthening characteristics for an electrode. Such is shown in U.S. Pat. No. 1,940,385. However, contact tab attachment and conductive capabilities are not discussed. The conversion of all of the nickel hydroxide to nickel metal is done across the framework rather than in selective areas, for the purpose of achieving greater strength.

SUMMARY OF THE INVENTION

An object of the present invention is to overcome the disadvantages of the prior art by providing an electrode with a selected conductive contact area while maintaining cell capacity at levels higher than the prior art. It is a further object of the invention to overcome difficulties in the prior art by providing a conductive contact area to which a contact tab can be securely welded.

It is a further object of the present invention to provide a method for making a plurality of electrodes from a single coated substrate having at least one selected conductive contact area. Another object of the invention is to provide an electrode for an electrochemical cell of the type that utilizes an edge of the electrode as the conductive contact area.

The instant invention provides an electrode for an electrochemical cell having a selected conductive contact area and the method for making the same. The electrode can be of foam metal or metallic fibers impregnated with an electrochemically active material, namely a paste or other mixture of nickel hydroxide paste. Alternatively, the electrode can be formed from a metal substrate coated with a porous sintered nickel coating. The nickel coated substrate is then impregnated with a nickel hydroxide active material. In order to connect the electrode to a battery terminal, it is necessary to provide a conductive contact area. This is achieved by selectively exposing the nickel hydroxide coated electrode to a heated hydrogen source at the selected contact location. This will convert the nickel hydroxide to nickel metal at the selective location and provide a conductive contact area. The converted nickel metal will provide an area to which a contact tab can be welded if required.

Also, a plurality of electrodes may be formed using the method described above. A conversion apparatus consisting of a directed heat source in a hydrogen atmosphere may be used to convert a strip of the nickel hydroxide coated electrode material to nickel metal. This will facilitate slitting the electrode material along the converted strip into desired shapes and sizes. This method will provide a conductive metallized edge for the resulting electrodes. Thus, the method disclosed can be utilized to form more than one electrode.

The foregoing is but a brief description of some of the features of the present invention and these and other features of the present invention are more fully described in the specification which follows, and as embraced by the appended claims.

BRIEF DESCRIPTION OF THE DRAWINGS

While the specification concludes with claims particularly pointing out and distinctly claiming the present invention, the invention will be more readily understood from the following descriptions of the preferred embodiments which are given by way of example with the accompanying drawings in which:

FIG. 1 is a plan view, partially broken away, of an electrode with a conductive contact area and contact tab connection made in accordance with the instant invention.

FIG. 2 is a side schematic view of a heat source in a hydrogen atmosphere used to convert the nickel hydroxide.

FIG. 3 is a plan view of electrode material showing a conductive converted strip area suitable for slitting and/or welding.

FIG. 4 is an elevational cross-sectional view of a cell utilizing an electrode made by the method of the instant invention.

FIG. 5 is a perspective view of a spirally wound cell pack, partially broken away, utilizing an electrode made by the method of the instant invention.

FIG. 6 is a top view of the cell pack of FIG. 5 showing the contact to the battery terminal.

PREFERRED EMBODIMENTS OF THE INVENTION

An electrode for incorporation in an electrochemical cell such as a nickel cadmium cell is shown in FIG. 1. The electrode 11 is preferably a positive electrode and is designed to be rolled up with a counter electrode and interleaved separator to form a spirally wound cell pack for an electrochemical cell. The substrate for the electrode may be in the form of a flexible foam metal plate 13 having a porosity typically from about 80 to about 95 percent, having one of its major surfaces impregnated with an electrochemically active material 15 namely nickel hydroxide paste as is well known in the art. Alternatively, the electrode may be formed of a perforated metal substrate having at least two major surfaces, wherein one of the major surfaces is covered with porous sintered nickel adhered thereto and impregnated with active nickel hydroxide (by "nickel hydroxide" herein is also included NiOOH).

A conductive contact area is required to carry current from the electrode to a terminal of the electrochemical cell. Furthermore, in some cells it is necessary to provide a contact tab attached to the conductive area to make such a connection. It is preferable to attach such a tab by welding it to the conductive area. In the past, this has been difficult to achieve because of the lack of metal of adequate mass in the conductive contact area for the welding process.

FIG. 1 shows a conductive area 12 of electrode 11 which has been converted or reduced to nickel metal for conductivity. This contact area of nickel metal is achieved by exposing the nickel hydroxide impregnated electrode to a heat source in an atmosphere containing a reducing gas such as hydrogen. The chemical reaction for the conversion or reduction to nickel metal is Ni(OH)$_2$+H$_2$=Ni+2H$_2$O. Conductive tab 14 is then conventionally welded to electrode 11 at the converted area 12 as required.

FIG. 2 schematically shows the heat source 30 in a hot hydrogen atmosphere 31. Any heat source which can be directed at the selected area and which can be shrouded with hydrogen can be used. Examples include a plasma source, a laser, an induction heater, a microwave, a resistance heater or a plate lab oven directed by means of a heat sink. To convert nickel hydroxide the heat source should be able to reach the temperature of 1,600° F. plus or minus 50° F. to provide preferred times for exposure. Lower temperatures would require a longer exposure time to convert all the nickel hydroxide.

Preferably shrouding of the heat source is done with between 5–10% hydrogen gas mixed with an inert gas, such as nitrogen, argon, helium, or any of the noble gases. During exposure, electrode 11 would be supported in the chosen location on suitable support 35.

The time interval of the exposure typically can extend from 10 seconds down to one-half second at the higher temperatures. It is necessary that the source of the hydrogen atmosphere be steady flowing throughout the process in order to remove the moisture or water vapor produced by the reaction. The flow of hydrogen, furthermore, will drive off any organics or binders remaining in the converted nickel metal so that maximum conductivity is achieved. The resulting nickel metal will provide a material suitable for welding a contact tab.

FIG. 3 shows an alternative embodiment in which a plurality of electrodes 28, 29 can be made using a single substrate strip 21 impregnated with an electrochemically active material 23. The substrate strip may be in the form of a foam metal substrate impregnated with an electrochemically active material, namely nickel hydroxide paste, or it may be in the form of a perforated metal plate covered with porous sintered nickel and impregnated with the active nickel hydroxide. The strip should be wide enough to form more than one electrode of desired size. To subdivide the strip into the desired size and shape electrodes required, a dynamic or continuous version of the method of exposure or conversion described above is used.

Before the strip is slit or cut into the desired sizes, it is exposed by moving it in the direction of arrow 19 in relation to a directed heat source in a hydrogen gas atmosphere as described above and shown schematically in FIG. 2. The exposure is preferably limited to the area immediately adjacent line 25 along which the electrode strip is to be slit or cut. The nickel hydroxide along the slit line is reduced or converted to nickel metal upon exposure and thus cutting or slitting of the densified nickel metal can be easily achieved. It will also provide metallized edges 26 and 27 for the finished electrodes. These edges will be electrically conductive and can be used as conductive contacts connecting the electrodes and terminals of the electrochemical cells in which the electrodes are inserted.

The method described above thus can be used to produce multiple electrode strips in assorted shapes and sizes from a single impregnated substrate by selectively exposing the substrate to a directed heat source in a hydrogen atmosphere along selected lines. The substrate can be then cut or slit into the desired widths and cross cut to size. Similarly the conversion process can be selectively controlled so that the exposure will result in reduced nickel metal along the slit or cutting lines which will provide the conductive area for current collection to a battery terminal, and maximize the amount of active material remaining in the electrode.

Reference is now made to FIGS. 4 and 5 which will show the electrodes described above installed in electrochemical cells.

FIG. 4 shows a cell having a spirally wound construction. The cell includes the electrode and contact tab of the instant invention of the type illustrated in FIG. 1. An electrically conductive casing 40 forms one terminal of the cell. Within the cell is mounted a winding spindle 41 formed of insulating material and having spirally wound thereon a four-layer assembly consisting of a first layer 42 which is the negative plate, a second layer 43 formed of a porous insulating separator, a third layer 44 which is a positive plate, and a fourth layer 45 which is a porous insulating separator. In this case, the positive plate 44 has a conductive area made by the conversion technique as described above. Contact tab 46 is welded to the conductive area and provides a connection between the positive electrode and the positive terminal 50 cell.

The conversion method described above can also be used to provide a conductive area for contact adherence for the negative plate. In such an example and at the temperature used for conversion, an electrode impregnated with cadmium hydroxide is selectively exposed to at least partially remove or vaporize the cadmium hydroxide (through the intermediate species, cadmium metal) at a selected conductive area. Contact tab 48 would then be welded primarily to the substrate and to any residual cadmium metal left following the conversion process, at such a selected area and the negative plate connected to the cell casing 40 through contact tab 48.

FIG. 5 show one of the electrodes 28, 29 formed by the method described above in conjunction with FIGS. 2 and 3, used in a spirally wound electrochemical cell. The wound cell comprises positive electrode 28, a first separator 37, negative electrode 30 and a second separator 32.

Plates 28 and 30 with separators 37 and 32 there between are spirally wound to form coil cell pack 50. Plates 28 and 30 are transversely offset from one another as well as separators 31 and 32, to provide an extended longitudinal edge 26 of plate 28 at one end of coil 30 and an extended edge 33 of plate 30 at the opposite end of coil 50. The extended edges 28 and 33 are conductive edges which can be formed of reduced metal by the conversion method described above.

With respect to the negative electrode 30 the conductive edge can be achieved by exposing the cadmium hydroxide coated substrate to a heat source in a hydrogen atmosphere to vaporize the cadmium hydroxide via cadmium metal as described above with respect to the negative electrode.

To attach the conductive plate edge 26 of positive plate 28 to positive terminal of the cell, current collector 55 is provided at one end of the coil 50. A second current collector is provided at the lower end of coil 50 (FIG. 6) to contact edge 33 but illustration thereof is omitted because it is identical to collector 55. Current collector 55 comprises two substantially planar leg portions 56 and 57 and a raised central portion 58 attached to the leg portions 56 and 57. The leg portions 56 and 57 contact (such as by percussion weld) the extended conductive edge 26 of the positive electrode. The raised central portion 58 is welded to the base of a cover disc for the cell can which forms the positive terminal of the electrochemical cell can. Similarly, the central portion of the negative current collector (not shown) is welded to the base of the cell can which forms the negative terminal of the cell.

The invention has been disclosed with particular reference to producing the positive electrode of an electrochemical cell. However, as noted above, the conversion method can be used to produce negative electrodes having selected conductive areas. Thus, the process of the instant invention can be used to convert cadmium in an electrode impregnated with cadmium hydroxide to reduced cadmium metal and then vaporize the cadmium metal at selective areas. The conversion technique can also be used, for instance, to convert an electrode impregnated with cobalt hydroxide to reduced cobalt metal at a selected area. The temperature of the heat source could be varied depending on the particular reducible metal used if desired.

Although the preferred embodiment has been disclosed with reference to electrodes for spirally wound cells it is noted that such electrodes could be used in various shaped cells including those having a flat parallel plate construction.

Although the preferred embodiment has been disclosed with reference to an electrode for a nickel cadmium cell, other cell types could be used. For example, a nickel zinc cell, nickel metal hydride cell, or a nickel hydrogen cell could also utilize the electrode and method of the instant invention.

What is claimed is:

1. The process of making an electrically conductive contact area for an electrode of an electrochemical cell, said electrode comprising an electrically conductive porous substrate having at least two major surfaces, a layer of an electrochemically active nickel hydroxide material attached to at least one of said major surfaces and at least partially covering said one major surface and impregnating pores in the substrate, said active nickel hydroxide material being a reducible species of nickel metal, at least one conductive contact area formed of metallic nickel attached to said substrate, said process comprising the steps of exposing said nickel hydroxide reducible species impregnated substrate to a heated hydrogen gas at a selected contact area, converting said reducible species nickel hydroxide at said selected contact area to a reduced metallic form of nickel metal, so as to render said contact area electrically conductive.

2. The process of claim 1 further comprising the steps of attaching a conductive tab to said conductive contact area.

3. The process of claim 2 wherein said step of attaching said contact tab comprises the step of welding said tab to said reduced metallic nickel at said selected contact area.

4. The process of claim 1 wherein said step of exposing comprises the step of heating said hydrogen gas to a temperature of 1,600° F.±50° F.

5. A process for manufacturing electrodes for rechargeable electrochemical cells, said process comprising the steps of providing a substrate, impregnating said substrate with an electrochemically active reducible species of nickel hydroxide, exposing said nickel hydroxide impregnated plate to heated hydrogen gas, said step of exposing comprising the step of converting said nickel hydroxide to nickel at a selected contact area so as to make said selected contact area electrically conductive.

6. The process of claim 5 comprising the step of moving said substrate relative to said heated hydrogen gas so as to select a strip on said substrate as said selected contact area, and cutting said substrate into a plurality of electrodes along said strip.

7. The process of claim 5 wherein said step of providing a substrate comprises the step of providing a foam metal substrate.

8. The process of claim 5 further comprising the step of providing sintered metal on said substrate.

9. The process of claim 5 wherein said step of converting includes the step of driving off any organic remaining in said substrate.

* * * * *